United States Patent [19]
Culp

[11] 3,810,134
[45] May 7, 1974

[54] MEMORY BIT DRIVE CIRCUITRY PROVIDING COMMON TERMINATING IMPEDANCE TO A SENSE LINE

[75] Inventor: Stuart David Culp, Whitesboro, N.Y.

[73] Assignee: General Electric Company, Utica, N.Y.

[22] Filed: July 18, 1972

[21] Appl. No.: 272,996

[52] U.S. Cl. .................... 340/174 PW, 340/174 AD, 340/174 DA, 340/174 M, 340/174 TF, 340/174 TL

[51] Int. Cl. ........................ G11c 11/04, G11c 11/14

[58] Field of Search 340/174 AD, 174 DA, 174 PW, 340/174 TL

[56] References Cited

UNITED STATES PATENTS 3,697,967 10/1972 Homma ........................ 340/174 DA
3,209,337 9/1965 Crawford ..................... 340/174 TL

*Primary Examiner*—James W. Moffitt

[57] ABSTRACT

In a memory, for example a non-destructive read out matrix memory, improved means are provided for writing into a selected bit line. Each bit is written into a storage cell which is magnetically coupled to a sense pair. In the present invention, a bit driver is connected across each sense pair. The bit driver comprises a current source. Consequently, the bit driver does not reflect a load into the sense pair during a write operation. During a read operation, the bit driver presents no impedance to the sense line. Consequently, a common terminating impedance is provided to the sense pair during both read and write, improving memory speed and precision of operation.

4 Claims, 5 Drawing Figures

PATENTED MAY 7 1974 3,810,134

SHEET 1 OF 2

MEMORY BIT DRIVE CIRCUITRY PROVIDING COMMON TERMINATING IMPEDANCE TO A SENSE LINE

BACKGROUND OF THE INVENTION

This invention relates to memories which are accessed via a sense line. More particularly, it relates to such memories including means for writing bits into storage cells.

One form of memory accessed via sense lines, which may be sense pairs, is a matrix memory. In a matrix memory, conductors are arranged in columns and rows. Storage cells are at each intersection of conductors. Each storage cell contains a binary bit which is either electrical or magnetic energy indicative of a value of one or zero. All the bits in a column comprise a "word" which may be indicative of a number or other information. When the proper interrogating signals are applied to the column, electrical energy indicative of each bit is supplied at the end of each row for connection to utilization means, commonly a register. The register may be connected to circuitry for performing computations or connected to a display. Since the present invention is primarily applicable to non-destructive read out memories, it is discussed in the context of a non-destructive read out memory. A significant form of non-destructive read out memory is a plated wire memory.

The term "plated wire" refers to a specially cleaned and prepared fine beryllium-copper wire electroplated with a thin layer of magnetic alloy. A bit comprises a circumferential magnetic charge in the film. A magnetic charge in a first direction corresponds to a one, while a magnetic charge in the opposite direction corresponds to a zero. Plated wires are matrixed with word conductors. In order to read information from the memory, a word current is supplied to a word conductor. The word current rotates the magnetic vector of each storage cell which the word conductor overlies, and an electrical signal corresponding to the bit stored in each storage cell is induced in the beryllium-copper wire which the storage cell surrounds. The term "bit" is also used to refer to the electrical signal corresponding to the bit in the storage cell. As a result of this operation, one bit is supplied at the end of each row for providing a word to utilization. Since the beryllium-copper wires each comprise a conductor folded back on itself, each beryllium-copper wire is referred to as a sense pair. Outputs are provided at each sense pair and the outputs when connected to utilization means form a word. In order to write a bit into a storage cell, current is supplied to a sense pair and a word conductor. The polarity of current supplied determines whether a one or a zero is written into the storage cell.

For a given computer application, it is desired to store a particular number of words in a memory, each word having uniform bit length. In a typical application, it may be desired to store 8,192 words, each 34 bits long. This would require bit lines 8,192 bits long so that each word line would be traversed by a bit line. However, it is a well-known memory design practice, to limit the length of bit lines to approximately 1,000 bits. This reduces losses in the sense lines and reduces propagation delays improving memory speed. Therefore, the memory may be reorganized as a matrix of 1,024 words, and 272 bits per word. This reorganization requires an eight to one bit multiplex. In order to read and write with such a memory, access circuitry to each bit line must be provided. The 272 sets of circuitry are arranged into 34 channels, each channel providing a switching scheme for access to one sense line. Each set of sense lines, the channel associated therewith and the portions of word lines associated therewith is referred to in the present description as a multiplex group. Thus, in the present example, eight sense lines in one multiplex group provide an eight to one word multiplex.

It is desirable in the construction of matrix memories to use the bit lines to carry both read-out signals and bit write current. The circuitry which provides the bit write current is called the digit drive circuitry. A scheme must be provided for coupling write current to a desired bit line in a multiplex group.

One prior arrangement for providing this operation along with the above-described multiplexing of write current is the provision of an electronic switch in each bit line and one digit drive circuit to provide write current to all of the switches. One switch is selected to couple write current to one bit line. However, the electronic switch imposes limitations on both the speed at which the writing can be performed and circuit recovery speed after writing is completed. Also, with presently available techniques, it has been difficult to achieve this embodiment for operation over broad temperature ranges such as those required for military applications. An alternative is the simplification of digit drive circuitry such that multiplexing is not done at all, but one digit drive circuit is provided for each bit line. However, in such arrangements, the bit drive circuit often comprises an impedance which is not an impedance match for the bit line. Consequently, write speed is degraded. Also, a change in the impedance terminating the sense lines when switching from the write operation to read, results in degradation of the wave form comprising the readout. This results in imprecision in the time span of read and write operations. In a memory in which the sense, or read, and write currents share a common sense line, difficulty has been presented by the change in impedance terminating a sense line when switching from read to write modes of operation.

SUMMARY OF THE INVENTION

It is, therefore, an object of the present invention to provide a memory in which a storage cell is accessed via a sense pair, or other sense line, for both reading and writing operations in which sense pairs can be terminated by one set of components whether being utilized in reading or writing functions, whereby the sense pairs form transmission lines having a common impedance during both modes of operation.

It is a further object of the present invention to provide a matrix memory including an arrangement for providing write current to bit lines through the same wires on which output, or sense signals, are provided from the memory which multiplexing arrangement does not affect the sense signals.

It is also an object of the present invention to provide a memory of the type described in which the recovery time due to operation of write circuitry after a write operation is minimized, whereby speed in operation of the memory is facilitated.

It is also an object of the present invention to provide a memory of the type described in which bit driving multiplexing circuitry can be implemented in a simplified manner and may utilize, for example, either diode transistor logic or transistor-transistor logic.

Briefly stated, in accordance with the present invention, there is provided in a memory having bits accessed via a sense line, which may be a sense pair, particularly a non-destructive readout matrix memory, means for providing write currents to selected bit lines. Each sense pair coupled to a bit line has connected thereacross a bit drive circuit comprising a current source, and is terminated by a fixed impedance. Consequently, a bit driver does not reflect a load into a sense line during a write operation or present an impedance during a read operation. In a further embodiment, a decoder circuit is connected to each of a group of bit drivers. An address signal provided to the decoder energizes one bit driver circuit to provide a write current for performing a writing operation.

BRIEF DESCRIPTION OF THE DRAWINGS

The means by which the foregoing object and features of novelty are accomplished are pointed out with particularity in the claims forming the concluding portion of the specification. The invention, both as to its organization and manner of operation, may be further understood by reference to the following description taken into connection with the following drawings.

Of the drawings.

DESCRIPTION OF THE PREFERRED EMBODIMENT

Figures 1, 2A, 2B:
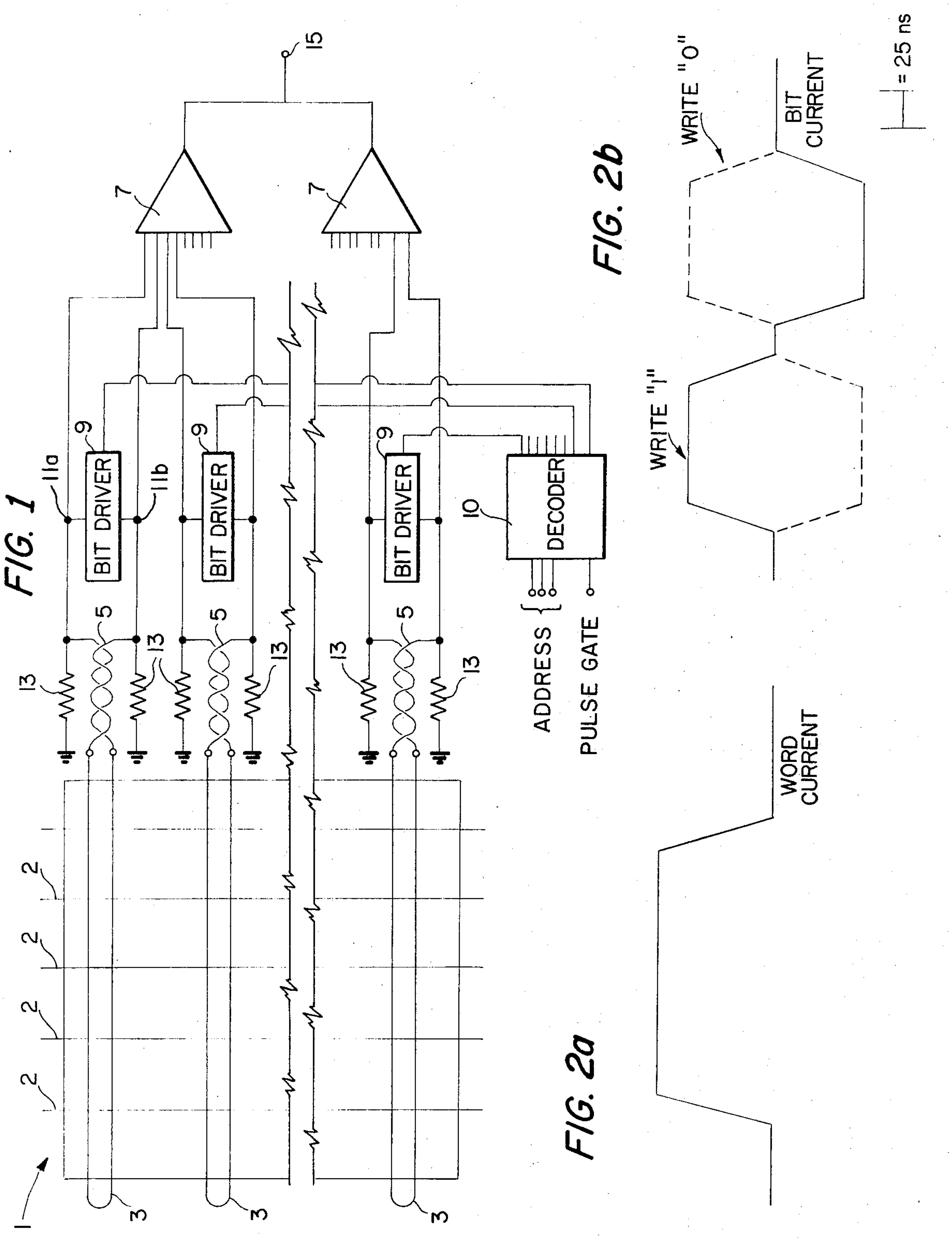
FIG. 1 is a block diagramatic representation of a memory constructed in accordance with the present invention.
FIGS. 2*a* and 2*b* are waveform diagrams useful in understanding the operation of the present invention.

Referring now to FIG. 1, there is illustrated in block diagramatic form a memory constructed in accordance with the present invention. A matrix 1 consisting of word lines 2 and bit lines 3. Each bit line 3 is connected to read and write circuitry via a sense line or sense pair 5 which is coupled to one of a number of sense amplifiers 7 and bit drivers 9. A decoder circuit 10 may be coupled to address a group of bit drivers 9. The sense amplifiers 7 are coupled to an output terminal 15 for connection to utilization means (not shown) such as a processor.

Each sense pair 5 and bit line 3 coupled thereto, form a transmission line. Each terminal of the transmission line is terminated by an impedance 13, which is preferably purely resistive, having an impedance $R_t$. Each bit driver 9 is connected at terminals 11*a* and 11*b* across a sense pair 5, i.e., not in series between the sense pair 5 and sense amplifier 7. This may also be described as having the sense amplifier 7 directly connected to the sense pair 5. Consequently, the bit driver 9 is not in the series path between the bit line 3 and the output terminal 15 during a read operation. In accordance with the present invention, the bit driver 9 is selected to have a high impedance with respect to $R_t$. The bit driver 9 may comprise a well-known current source. Since the bit driver 9 impedance is high with respect to $R_t$, the bit driver 9 presents no impedance to a bit during a read operation and does not reflect a load into the sense pair 5 and bit line 3 during a read operation. Common impedance to the sense pair 5 is thus provided during both the read and write operations, i.e., when the sense pair 5 is operatively coupled to the bit driver 9 or sense amplifier 7. Consequently, maximum operating speed is facilitated, and precision of read and write signal wave forms is maintained.

Only a few sense lines 3 are illustrated by way of exemplification for simplicity in the drawing. A typical memory circuit constructed in accordance with the present invention would include, for example, 1,024 word lines 2 and 272 bit lines 3. Other combinations of numbers of words and numbers of bits to achieve the same or other capacity storage in terms of storage cells may also be provided in accordance with practice which is well-known in the art. The bit lines 3 may be divided into groups, all the bit drivers 9 associated with one of the groups being connected to a separate decoder 10. Therefore in FIG. 1, the decoder 10 may be viewed as representative of a plurality of decoders 10. In the memory circuit of FIG. 1, read operations are provided in a conventional manner as is well-known in the art. Output signals are multiplexed, also in a manner well-known in the art, such as by providing addressing signals to the sense amplifiers. These means are well-known and therefore not illustrated. For the purposes of the present invention, it is necessary to note that the multiplexing means for providing sense signals to the utilization means are not connected in series with the path for providing write signals to the bit lines 3. In the present embodiment, groups of eight bit lines are multiplexed. However, other numbers of bit lines may be multiplexed. Eight is chosen here because in the present embodiment, the decoding circuitry is simplified and a number of groups which is achieved economically is provided. Each bit driver 9 is connected across a sense pair 5. Each sense pair 5 is connected to a bit line 3. The bit lines 3 from one group are magnetically coupled to storage cells which store corresponding bits of multiplexed words. (Alternatively, the storage cells magnetically coupled to each sense line may simply contain bits of longer, non-multiplexed words.)

Operation of the memory is described with respect to FIGS. 2*a* and 2*b*, wherein FIG. 2*a* is illustrative of word current and FIG. 2*b* is illustrative of bit current. In a nominal embodiment, the height of FIG. 2*a* is 450 milliamps, the height of FIG. 2*b* is 40 milliamps and the word current pulse is 150 nanoseconds wide. When the command to write is provided from standard well-known circuitry (not shown), the word current of FIG. 2*a* is provided to a selected line 2 (FIG. 1) from a word current source which is also well-known (also not shown). The bit drivers provide the bipolar bit current pulses as illustrated in FIG. 2*b*. The solid line in FIG. 2*b* illustrates the bit current for writing a "one," and the dotted line represents the desired current for writing a "zero." While it is not necessary to provide a bipolar bit current pulse, bipolar pulsing is generally employed to improve data dependent noise sensitivity and to prevent the build up of undesired magnetic domains in the memories. A well-known control circuit (not shown) provides an enabling pulse to the pulse gate on the decoder 10 which comprises the write command. An address signal is also provided from the control unit to the decoder. The address signal may be a series of bits indicative of a number in binary form. The decoder decodes this input signal to provide an enabling signal to one bit driver 9. In this manner, the bit driver which provides the write current is selected. In this manner, any bit in the memory may be written into. During a read operation the word current is provided as described and the bit driver is not pulsed, the bit lines 3 functioning as sense windings feeding amplifiers 7.

FIG. 3*a* is a schematic illustration of a reliable and efficient manner in which to implement the circuit of FIG. 1 according to the present invention. In FIG. 3*a*, the same reference numerals are used to denote elements corresponding to those of FIG. 1. In accordance with the present invention, it is desired not to affect the terminating impedance of the sense lines. Since the bit lines 3 are transmission lines, and are terminated with an impedance 13 of R*t*, a bit driver 9 is provided which does not alter this impedance relationship. Therefore, in the preferred form of the present invention, the bit driver circuits 9 each comprise current sources. The number of current determining components are minimized in order to provide for greater precision in write current and reliability in operation. One bit driver 9 is fully illustrated in schematic form in FIG. 3*a*. Transistors 30 and 31 are provided having their emitter-collector circuits connected in parallel. A resistor 32 is connected between the emitter of the transistors 30 and 31 and the positive side of potential source S. The resistor 32 is common to all bit drivers in one multiplex group and determines current level for all bit driver output for both polarities of write current. A resistor 36 is connected across the series combination of the resistor 32 and the emitter-base circuit of the transistor 30. A resistor 37 is connected across the series combination of the resistor 32 and the emitter-base circuit of the transistor 31. The base of the transistor 30 is connected to an address output of the decoder in order to be responsive to an address signal provided by the decoder 10, and the base of the transistor 31 is also connected to a decoder output. The emitters of the transistors 30 and 31 are connected to a common point 40 which is common to all bit drivers of a multiplex group. A resistor 42 is connected between the collectors of the transistors 30 and 31. The collectors of the transistors 30 and 31 are connected to opposite ends of a transformer winding 45 of a transformer 46. The center tap of the winding 45 is connected to the negative site of the source S.

Second and third windings 47 and 48 of the transformer 46 are connected in parallel and coupled across the sensor input terminals. A diode 49 is connected in series with the secondary winding 47. A diode 50, oppositely poled with respect to the diode 49 is connected in series with the secondary winding 48.

Figure 3B:
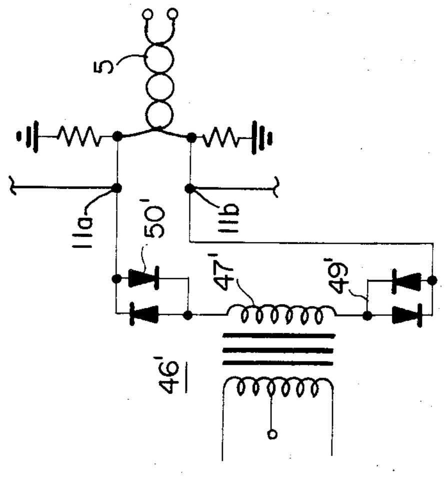
FIGS. 3*a* and 3*b* are schematic illustrations of embodiments of bit drive circuits incorporated in the present invention.
Figure 3:
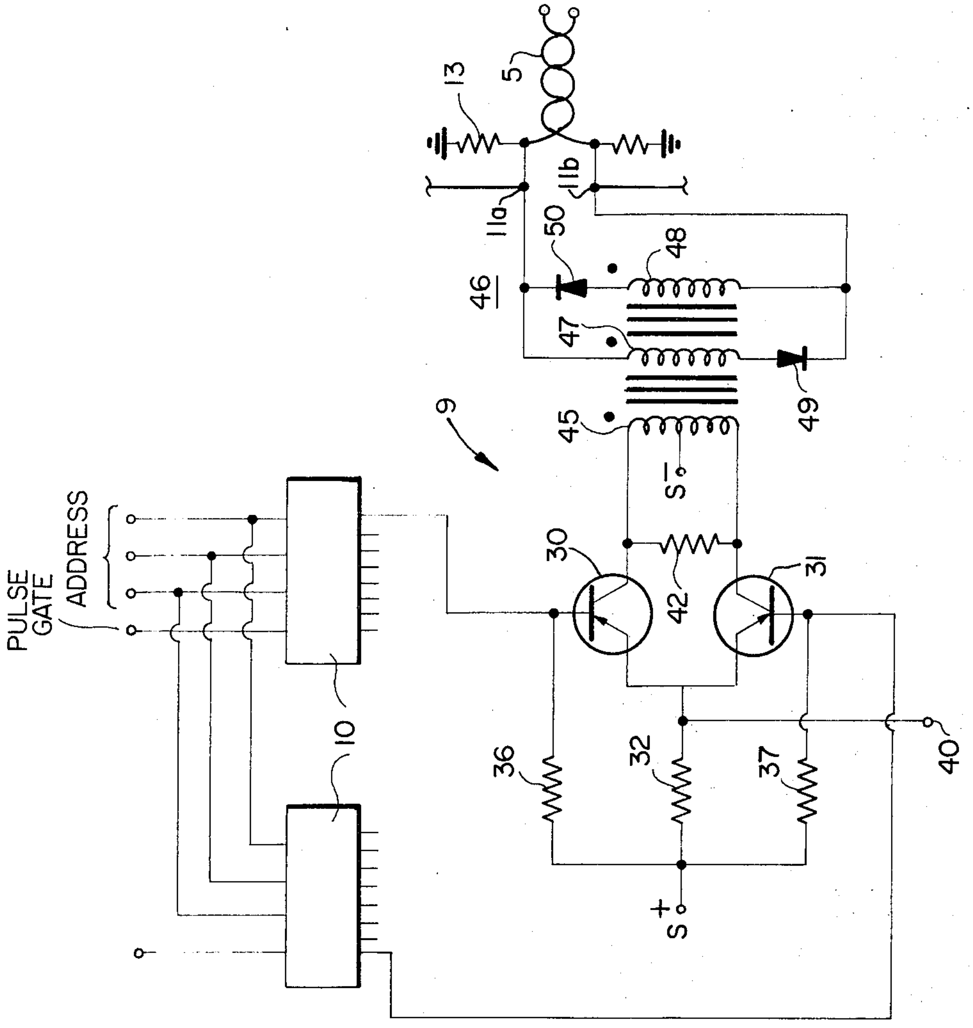

Alternatively, as illustrated in FIG. 3*b*, a transformer 46' may be provided having a single secondary winding 47'. A parallel connected inversely poled diode pair 49' is connected to a first terminal of the winding 47' and a second parallel connected, inversely poled diode pair 50' is connected in series with the other terminal of the winding 47'.

Uniform currents are provided to each bit in a multiple group. Current levels for all bit lines for both polarities of write current are determined by the resistor 32. The write current I bit may be expressed as: I bit = ($V_s$ − Q 30 VBE − Decoder VCE) /R32 where the $V_s$ is the voltage provided by the source S, Q 30 VBE is the base-emitter voltage drop of the transistor 30, Decoder VCE is the voltage provided from the decoder 10 to the bit drive circuit 9 which is addressed, and R32 is the resistance of the resistor 32.

In operation, when an address signal is provided to the bit driver 9 of FIG. 3*a*, a voltage is supplied to one of the transistors 30 or 31. To provide a write current indicative of a first binary level, the decoder provides a voltage first to the base of the transistor 30 and then to the base of the transistor 31. Similarly, to provide a write current indicative of the other binary level, voltages are sequentially provided to the bases of the transistors 31 and then 30. Consequently, a voltage is provided across the primary winding 45 of the transformer 46 having a wave shape corresponding to that of the current wave form of FIG. 2*b*. At the completion of an input wave form from the decoder to one of the transistors 30 and 31, the resistors 36 and 37 insure rapid turnoff and back biasing of the decoder 10 output stages. The current transformer facilitates rapid operation and permits the use of a logic compatible decoder with respect to the bit lines since no voltage level shift is produced by the transformer. Since the write current is bipolar, the current-time integrals of each half of the write current input wave form are substantially equal, so that there is no net flux in the transformer at the completion of an input from the decoder. Relatively small values of net flux which may occur due to inequality of the time integrals of the opposite polarities of write current are quickly recovered by the diodes 49 or 50. This is significant since a net flux would provide a current to the sense pairs 5. The presence of this current comprises a direct current level shift, and if it is present during a read operation following a write operation, storage degradation known as "crawl" in the art can result. The diodes 49 and 50 also serve to keep the digit drive circuit disconnected from the sense lines during read operations. In practical applications, it may be assumed that readout signals have a lower level than the voltage drop of the diodes 49 and 50. As seen in FIG. 3*b*, one secondary winding may be used for the transformer 46, but two or more diodes are necessary to balance the sense lines. In the FIG. 3*a* embodiment, the center tap of the primary winding 45 of the transformer 46 is returned to the negative terminal of the voltage source S in order to insure linear operation of the bit drive current source circuit during the time that the current wavefront is propagating along the sense line. However, in other embodiments, conventional arrangements could be used. The resistors 13 terminate the sense lines during read and write operations. The resistor 42 dampens the transformer 46 after the diodes 49 and 50 turn off.

What is thus provided by the present invention is a common value of impedance terminating a sense line during both read and write operations in a memory in which a bit is accessed via the same sense line for both operations. The circuitry of the present invention facilitates highest operating speeds and provides for uniform and undistorted write currents. Further, the write current circuitry does not affect the memory circuit during read operation.

What is claimed as new and desired to be secured by letters patent of the United States is:

1. A memory matrix having plural magnetic storage cells each of which is adapted to store one binary data bit comprising, in combination:

a write/sense conductor interlacing said matrix such that it cooperates with a plurality of said cells, said conductor being folded back on itself to interact twice with each cell;

terminating impedances connected at each end of said write/sense conductor;

a plurality of word lines interlacing said matrix and interacting with said cells such that each cell cooperating with the same write/sense conductor interacts with a different word line;

means for supplying a read/write current signal to one of said word lines;

a bipolar sense amplifier having its inputs connected to said terminating impedances in parallel with said write/sense conductor;

a bit driver connected in parallel with said sense amplifier and constructed and arranged to supply a bipolar write signal to said write/sense conductor substantially concurrently with the application of said read/write current signal, thereby storing a binary data bit in the cell associated with said selected word line; and means for decoupling said bit drive from said write/-sense conductor during data read operations.

2. The memory matrix set forth in claim 1 wherein said bit driver comprises:

a voltage source;

switching means coupled to said voltage source and energyzable to provide write signals of selected polarity and indicative of binary information of a first or second value;

address means for energizing said switching means; and a current transformer for coupling said write signals to said write/sense conductor.

3. The memory matrix set forth in claim 2 wherein said current transformer includes first and second secondary windings connected in parallel and said means for decoupling includes first and second diodes connected in series with said first and second secondary windings respectively, said diodes being poled in opposite directions.

4. The memory matrix set forth in claim 2 wherein said current transformer has one secondary winding and said means for decoupling comprises first and second pairs of parallel connected oppositely poled diodes respectively connected to opposite terminals of said secondary winding.

* * * * *